US011953156B2

(12) United States Patent
Wei et al.

(10) Patent No.: US 11,953,156 B2
(45) Date of Patent: Apr. 9, 2024

(54) CORRUGATED PLATE HAVING SMOOTH TOP SURFACE AND DRAWBEADS AND STORAGE CONTAINER

(71) Applicant: SINOTECH ENERGY CO., LTD., Shanghai (CN)

(72) Inventors: Ying Wei, Shanghai (CN); Xiangao Feng, Shanghai (CN); Wei He, Shanghai (CN); Kang Wang, Shanghai (CN); Jinlin Zhang, Shanghai (CN)

(73) Assignee: SINOTECH ENERGY CO., LTD., Shanghai (CN)

( * ) Notice: Subject to any disclaimer, the term of this patent is extended or adjusted under 35 U.S.C. 154(b) by 0 days.

(21) Appl. No.: 18/458,930

(22) Filed: Aug. 30, 2023

(65) Prior Publication Data

US 2023/0408030 A1 Dec. 21, 2023

(30) Foreign Application Priority Data

Jun. 29, 2023 (CN) ........................ 202310780830.X

(51) Int. Cl.
*F17C 3/02* (2006.01)

(52) U.S. Cl.
CPC ........ *F17C 3/025* (2013.01); *F17C 2201/052* (2013.01); *F17C 2203/0304* (2013.01); *F17C 2203/0612* (2013.01); *F17C 2221/033* (2013.01); *F17C 2223/0161* (2013.01); *F17C 2260/033* (2013.01)

(58) Field of Classification Search
CPC ...... F17C 2203/0304; F17C 2203/0612; F17C 2223/0161; F17C 3/025; F17C 13/001; F17C 3/04; F17C 1/12
See application file for complete search history.

(56) References Cited

U.S. PATENT DOCUMENTS 3,118,523 A * 1/1964 Girot ........................ F17C 3/027 D8/382
3,299,598 A * 1/1967 Alleaume ............ B65D 90/027 52/630

FOREIGN PATENT DOCUMENTS

| | | | |
|---|---|---|---|
| CN | 101959752 | A | 1/2011 |
| CN | 103097797 | A | 5/2013 |
| CN | 104379441 | A | 2/2015 |
| CN | 112032550 | A | 12/2020 |
| CN | 115789502 | A | 3/2023 |
| CN | 115992929 | A | 4/2023 |
| CN | 116221613 | A | 6/2023 |
| CN | 116348702 | A | 6/2023 |
| EP | 1357345 | A2 | 10/2003 |
| FI | 20041209 | A | 4/2005 |
| FR | 3039248 | A1 | 1/2017 |
| WO | 2019043348 | A1 | 3/2019 |

* cited by examiner

*Primary Examiner* — Stephen J Castellano

(57) ABSTRACT

Disclosed are a corrugated plate having a smooth top surface and drawbeads, and a storage container. The corrugated plate includes a corrugated plate body, a longitudinal corrugation, a transverse corrugation, and an intersection portion. The intersection portion includes a smooth top surface and four drawbeads extending from the top surface to the corrugated plate body. The top surface transitions to the drawbeads smoothly. An overall extension direction of each of the drawbeads intersects a transverse direction, a longitudinal direction, and a height direction perpendicular to the corrugated plate body.

20 Claims, 19 Drawing Sheets

B-B

CORRUGATED PLATE HAVING SMOOTH TOP SURFACE AND DRAWBEADS AND STORAGE CONTAINER

CROSS-REFERENCE TO RELATED APPLICATIONS

This application claims the benefit of priority from Chinese Patent Application No. 202310780830.X, filed on Jun. 29, 2023. The content of the aforementioned application, including any intervening amendments thereto, is incorporated herein by reference in its entirety.

TECHNICAL FIELD

The present disclosure relates to the field of liquefied gas storage tanks for marine engineering equipment, particularly marine equipment such as ships, and particularly to a corrugated plate for a liquefied gas storage tank of a transport device, particularly marine equipment such as a ship, and a storage container including the corrugated plate. The storage container particularly includes the liquefied gas storage tanks for marine equipment such as ships. Liquefied gases include, for example, liquefied natural gas, liquid nitrogen, liquid oxygen, liquid hydrogen, and liquid helium, etc.

BACKGROUND

Liquefied natural gas (LNG) constantly serves as first-choice energy to substitute for petroleum due to its advantages of greenness, environment friendliness, and high efficiency, and becomes one of the fastest growing energy industries in the world. With the rapid development of China's economy and the continuous improvement of environmental governance requirements, the application and development of LNG has attracted more and more attentions, and the demand of the society for clean energy has increased rapidly. LNG is one of the critical directions for the future development of clean energy in China.

Transportation of LNG typically relies on transport devices, e.g., marine equipment such as ships. The composition of an LNG receiving station mainly includes wharf unloading, LNG storage, process treatment, and external transportation. An LNG storage tank undertaking a storage task has the longest construction period, the most advanced technology, and the most difficulties in a project construction process, and is always managed as a critical path of the entire project. Moreover, the construction form and technological innovation of the LNG storage tank are also the focus of attention from Chinese and international professionals in the industry.

In the LNG storage tank, a corrugated plate used to constitute a sealing layer needs to be able to maintain good sealability and stability under various use conditions, and therefore the configuration and quality of the corrugated plate are particularly important. An existing corrugated plate requires improvements in terms of material uniformity, smoothness, and strength at corrugations, particularly at an intersection of transverse and longitudinal corrugations.

Therefore, there is a need to provide a corrugated plate and a storage container having the corrugated plate to at least partially solve the above problems.

SUMMARY

A purpose of the present disclosure is to provide a corrugated plate. An overall shape of the corrugated plate of the present disclosure is smooth and stiff, with relatively sharp material deformations at particular positions, thereby not only ensuring an overall strength and stability of the corrugated plate, but also presenting better elasticity, contractility, and tension. The corrugated plate provided by the present disclosure may also maintain the performance of a raw material to a maximum extent.

The present disclosure further provides a storage container having the corrugated plate, e.g., a storage container used for storing LNG, wherein the corrugated plate may be used as a sealing layer of the storage container. In an implementation, the corrugated plate is cut into standard parts which are assembled as a sealing layer in the storage container. The sealing layer of the present disclosure has good flatness, causes little damage to a structure of a thermal insulation layer, and may reduce an impact of the sealing layer on a strength of a thermal insulation box. A structure of the sealing layer of the present disclosure is such that the sealing layer can be made thinner, so that an overall thermal conductivity of the storage container can be reduced to improve a heat preservation effect.

According to an aspect of the present disclosure, a corrugated plate for a liquefied gas storage tank of a transport device is provided. The corrugated plate includes a corrugated plate body, a longitudinal corrugation and a transverse corrugation that are formed on the corrugated plate body, and an intersection portion at an intersection of the longitudinal corrugation and the transverse corrugation, with a height of the longitudinal corrugation being less than a height of the transverse corrugation, and a maximum transverse dimension of the longitudinal corrugation being less than a maximum longitudinal dimension of the transverse corrugation, wherein the intersection portion includes a smooth central top surface and four drawbeads extending from the central top surface to the corrugated plate body, and the central top surface transitions to the drawbeads smoothly; wherein an overall extension direction of each of the drawbeads intersects a transverse direction, a longitudinal direction, and a height direction perpendicular to the corrugated plate body, and a height of the intersection portion is greater than the height of the longitudinal corrugation and the height of the transverse corrugation.

The central top surface and the four drawbeads at least partially constitute a body segment of the intersection portion, the intersection portion further includes two side segments that are located at two ends of the body segment in the transverse direction respectively, and a height of each of the side segments is less than the height of the transverse corrugation and a height of the body segment.

In an implementation, the side segment extends along the longitudinal direction and has a protrusion portion protruding from the transverse corrugation in the longitudinal direction.

In an implementation, a top of the side segment forms a trench extending along the longitudinal direction.

In an implementation, the intersection portion further includes a connection segment between the body segment and the side segment, and the connection segment presents a waist drum shape in the transverse direction.

In an implementation, each of the drawbeads has a ridge extending from a top to a bottom thereof, and a width of each ridge remains unchanged in a direction from the top to the bottom.

In an implementation, the intersection portion includes a connection segment between the body segment and the side segment, and a minimum longitudinal dimension of a top of the connection segment is equal to or close to the width of the ridge.

In an implementation, on a projection plane defined by the transverse direction and the height direction, top surfaces of the body segment and the connection segment present a rough straight line segment and are parallel to the corrugated plate body.

In an implementation, a trench parallel to the ridge and extending from the top to the bottom of the drawbead is provided between the ridge and the side segment.

In an implementation, the central top surface includes six boundary profiles, each of which is recessed towards a center of the central top surface, and all the boundary profiles have a same radius of curvature and/or a same length.

In an implementation, a longitudinal dimension of the central top surface is greater than a transverse dimension of the central top surface.

In an implementation, the intersection portion further includes a pair of side faces extending from the central top surface to the longitudinal corrugation, the pair of side faces have a same recessed shape and a same radius of curvature as the boundary profiles at respective top sides thereof, and a spacing between central positions on the pair of side faces in the height direction is greater than a spacing between bottom ends of the pair of side faces.

In an implementation, respective end projection profiles of the transverse corrugation and the longitudinal corrugation are formed into circular arc shapes.

In an implementation, the top of the side segment forms a four-pointed star shape from a look-down perspective.

In an implementation, in a top view of the corrugated plate, a body portion of each of the drawbeads extends along a direction that intersects both the longitudinal direction and the transverse direction, and a bottom segment of each of the drawbeads extends along the transverse direction.

In an implementation, a minimum transverse dimension of the top surface is more than twice a minimum longitudinal dimension of the top surface.

According to another aspect of the present disclosure, a storage container for a liquefied gas is provided, wherein a wall of the storage container includes a base layer and a sealing layer located on an inner side of the base layer, and the sealing layer includes the corrugated plate of any one of the implementations in the above solution.

In an implementation, the sealing layer includes:

a central section;

at least one annular section disposed around the central section, each of the at least one annular section including:

a plurality of sealing plates obtained by cutting the corrugated plate; and a first sealing connector disposed between the circumferentially adjacent sealing plates and fixing the two sealing plates on the base layer.

In an implementation, at least two annular sections are provided and are arranged in an encircled manner in sequence, and the sealing layer further includes an annular section second connector disposed between the adjacent annular sections and fixing the adjacent annular sections on the base layer.

In an implementation, transverse corrugations and longitudinal corrugations of all the sealing plates of the annular section respectively constitute radial corrugations and circumferential corrugations of the annular section, radial inner ends of a part of the radial corrugations extend to the central section, radial inner ends of the other part of the radial corrugations are located in a middle portion of the annular section and away from the central section, a maximum circumferential distance between the circumferentially adjacent radial corrugations is within a predetermined range, and a sealing end cap is mounted at a radial inner end of each of the radial corrugations.

In an implementation, the wall is a rectangular wall, the sealing layer includes arrayed sealing plates arranged in an array, the arrayed sealing plates adjacent to each other along a first horizontal direction are connected and sealed by a first sealing connector, and the arrayed sealing plates adjacent to each other along a second horizontal direction are sealed and connected by a second sealing connector.

In an implementation, the base layer also includes base layer plates arranged in an array, with a gap being present between the adjacent base layer plates, each of the arrayed sealing plates has a corrugation extending in the same direction as each gap, and the corrugation covers the gap.

In an implementation, the storage container is a liquefied gas storage container for marine equipment or a land-based apparatus for a cryogenic frozen liquid.

BRIEF DESCRIPTION OF THE DRAWINGS

The drawings of the present disclosure are used only as examples.

REFERENCE NUMERALS

Figure 1:
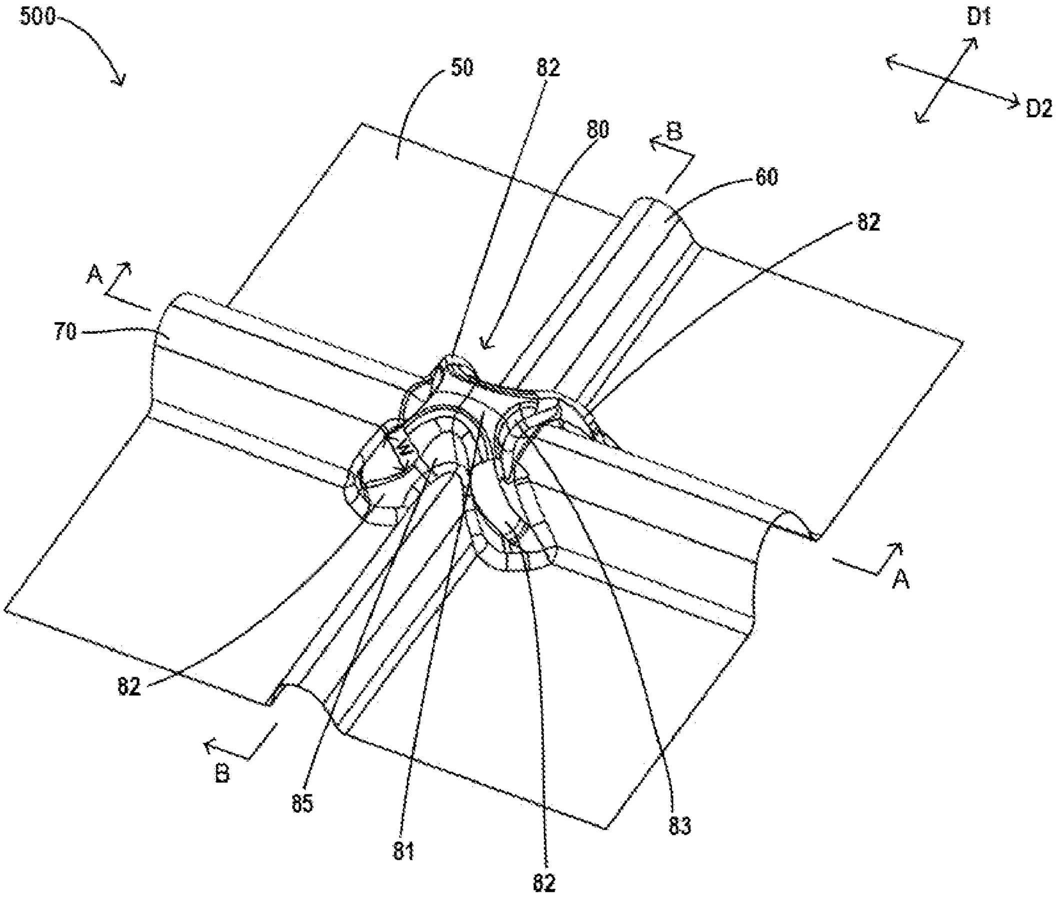
FIG. 1 is a schematic perspective view of a corrugated plate according to some preferable implementations of the present disclosure.

500, 100, 100': Corrugated plate
50, 10, 10': Corrugated plate body
60, 20, 20': Longitudinal corrugation
70, 30, 30': Transverse corrugation
80, 40, 40': Intersection portion
81, 41: Top surface
811, 46: First projection profile of the top surface
812, 45: Second projection profile of the top surface
8211, 8212: Profile boundary line
82: Drawbead
821: Top segment
822: Bottom segment
83: Second side face
84: Trench
85: First side face
42: Transverse end face
43: Longitudinal end face
44: Drawbead
441: Rib
411: Straight line segment
4121: Dome shape
412: Protrusion portion
400, 510: Base layer
4110: Base layer unit plate
410: Base layer annular section
420: Base layer central section
310: Central section
3110: Central sealing plate
320: Annular section
3210: Annular section sealing plate
520: Arrayed sealing plate
340: Annular section second connector
5210: First sealing connector
5220: Second sealing connector
420*a*: First annular section
420*b*: Second annular section
420*c*: Third annular section
350, 5110: Gap
360: The other part of radial corrugations
380: A part of radial corrugations
370: Sealing end cap
41': Body segment
411': Central top surface
412': Drawbead
4121': Ridge
4101': Roughly straight line segment
42': Side segment
421': Top of the side segment
422': Protrusion portion
43'. Connection segment
431': Central position on the connection segment in a transverse direction
432': Position where a top of the connection segment is connected with the side segment
433': Position where the top of the connection segment is connected with the body segment
44': Trench
45': Side face
4111': First boundary profile
4112': Second boundary profile
4113': Third boundary profile
4114': Fourth boundary profile
4115': Fifth boundary profile
4116': Sixth boundary profile

DETAILED DESCRIPTION

Figure 11:
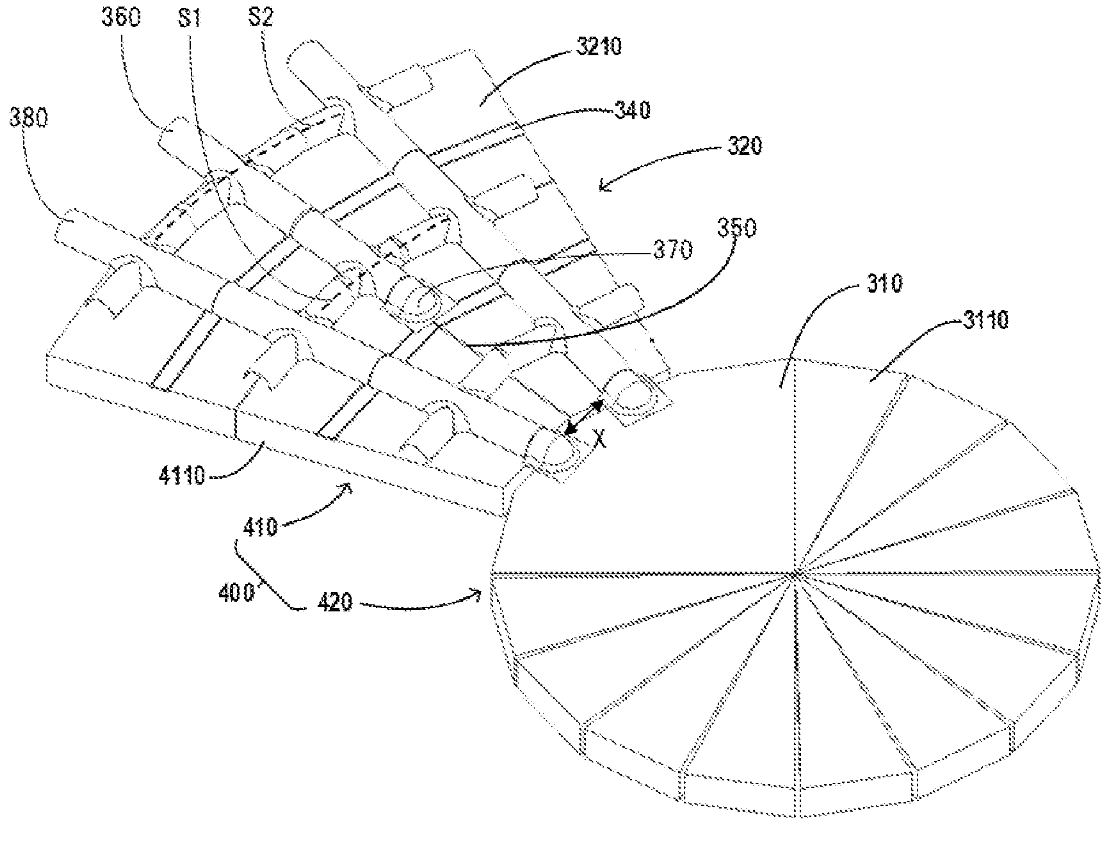
FIG. 11 is a partial top view of a bottom wall of a storage container in some preferable implementations.
Figure 12:
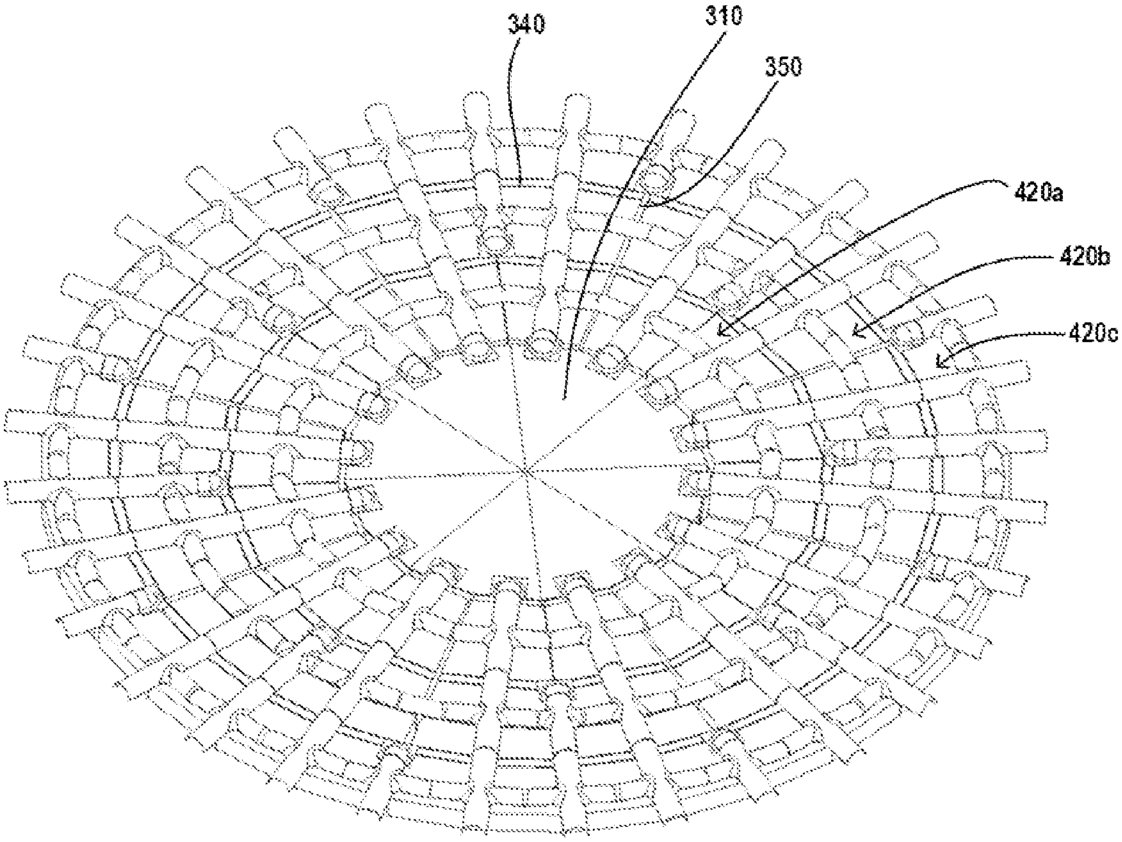
FIG. 12 is a top view of a roughly complete bottom wall sealing layer in FIG. 11.
Figure 13:
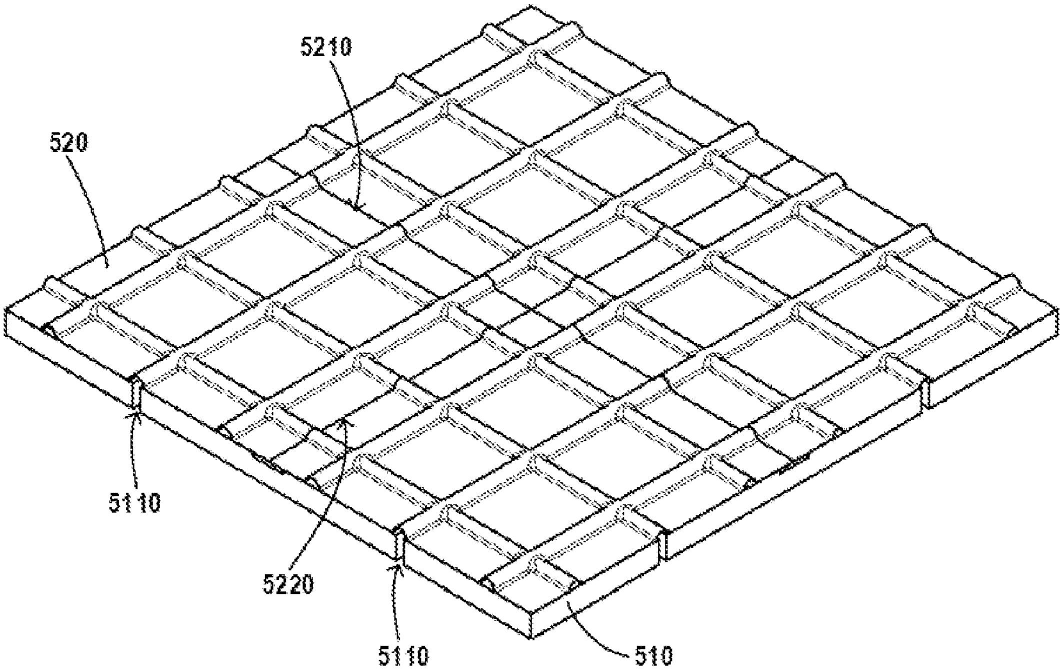
FIG. 13 is a schematic perspective view of another wall surface of a storage container in some preferable implementations.
Figure 14:
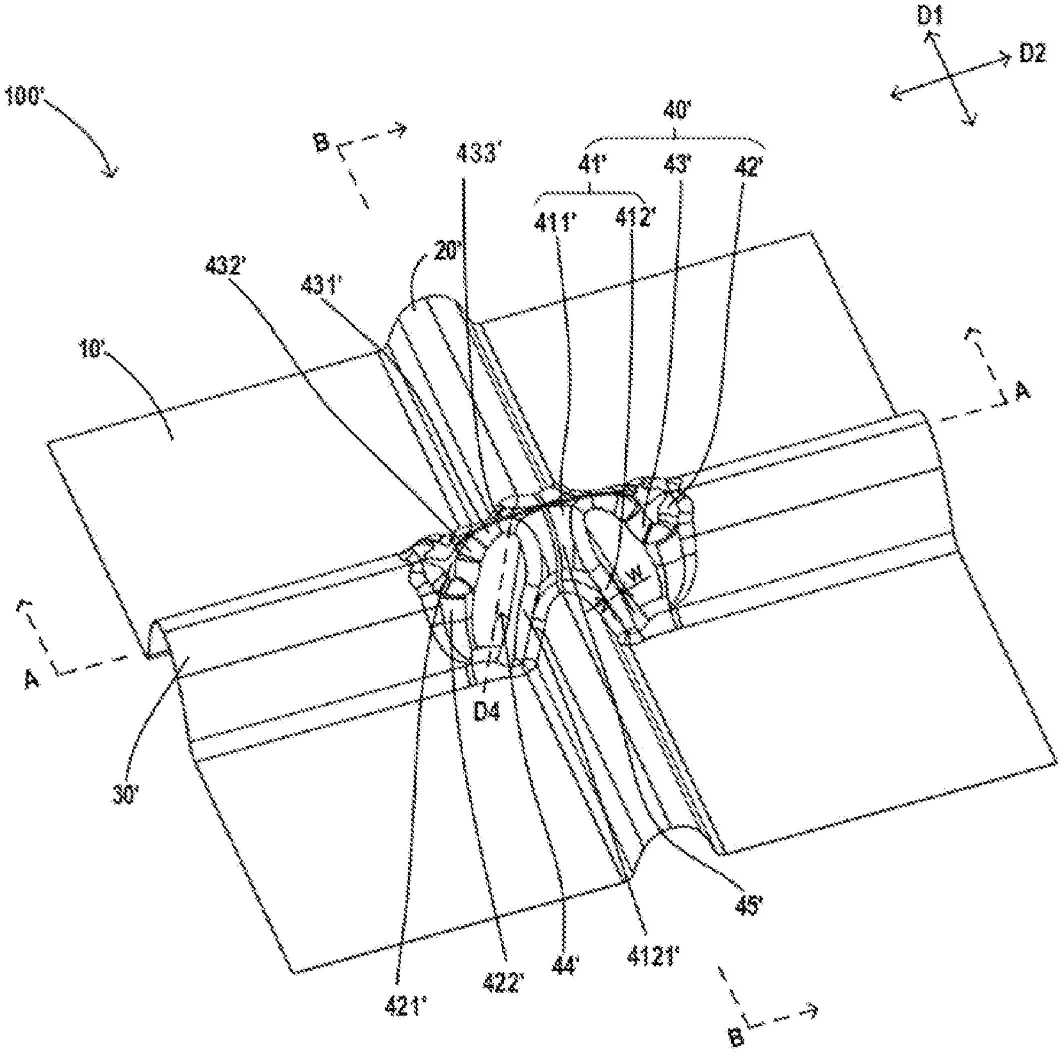
FIG. 14 is a schematic perspective view of a corrugated plate according to some other preferable implementations of the present disclosure.
Figure 15:
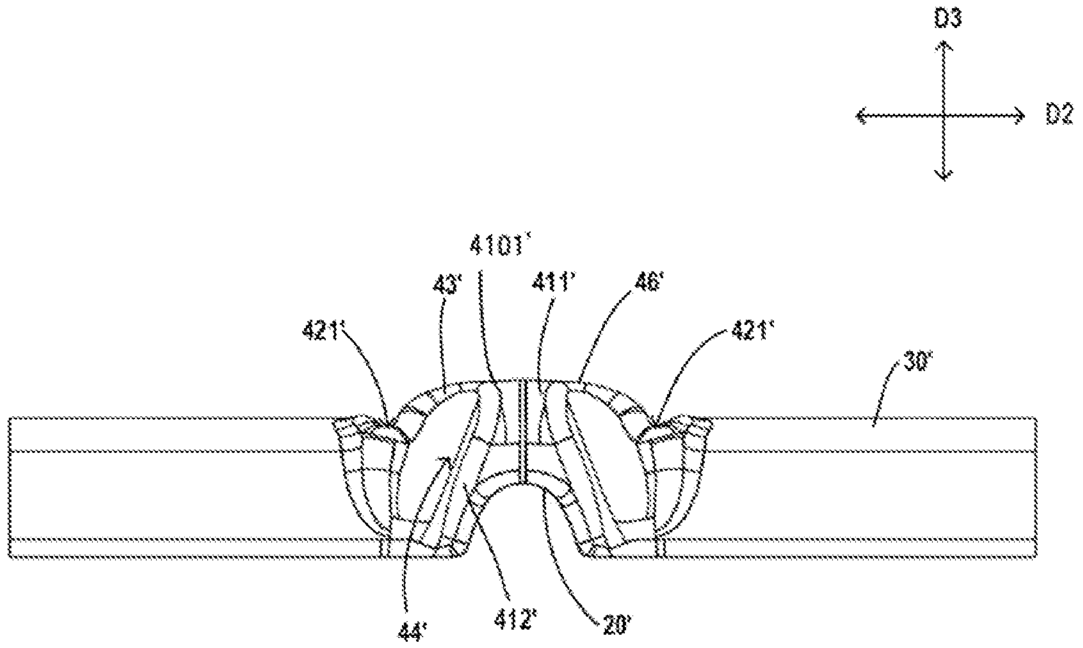
FIG. 15 is a projection of the corrugated plate in FIG. 14 on a projection plane defined by a transverse direction and a height direction.
Figure 16:
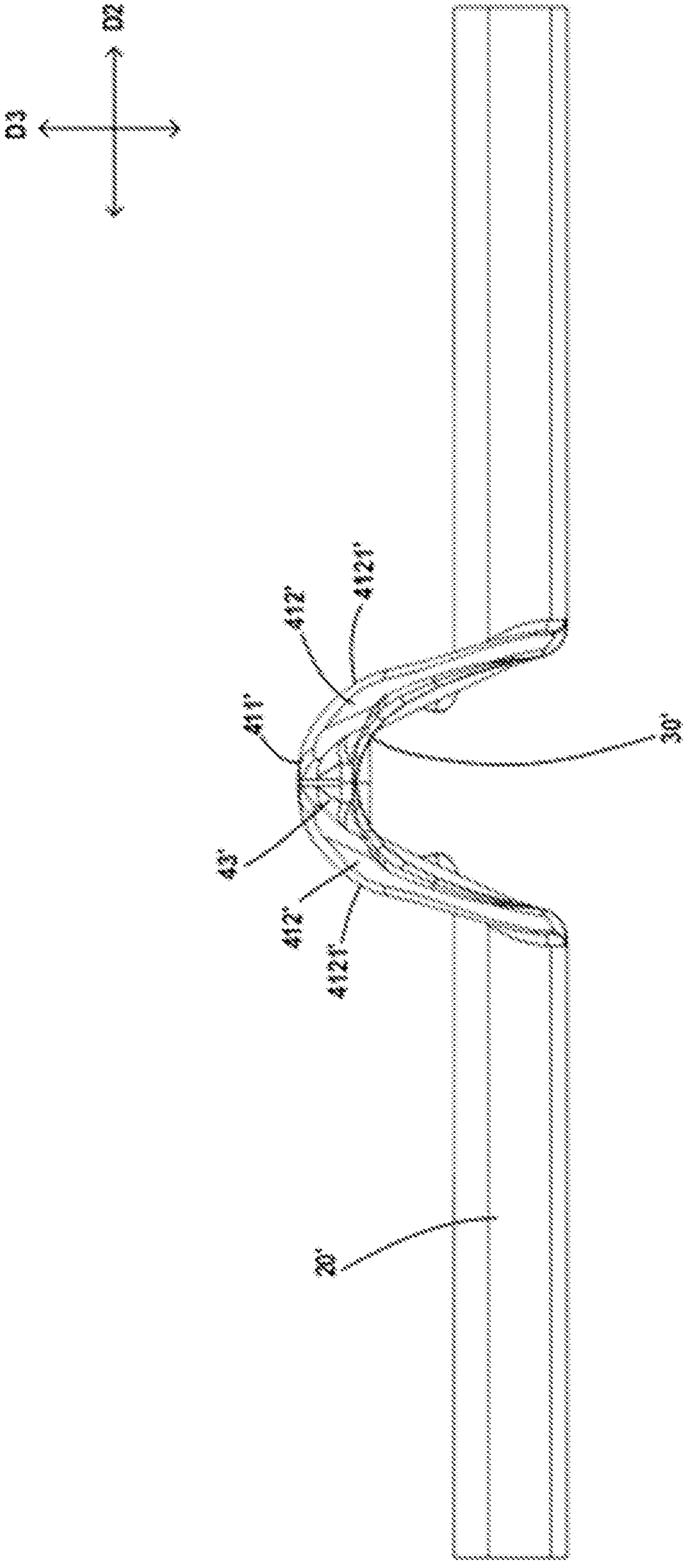
FIG. 16 is a projection of the corrugated plate in FIG. 14 on a projection plane defined by a longitudinal direction and a height direction.
Figure 17:
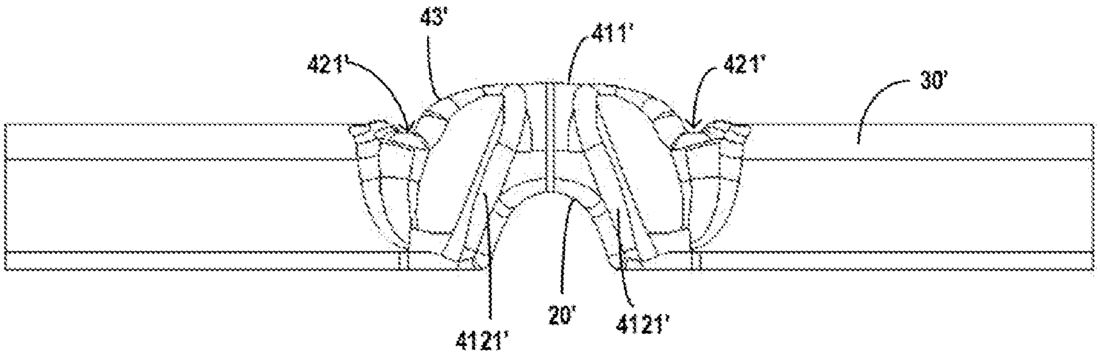
FIG. 17 is a cross-sectional view taken along a line A-A in FIG. 14.
Figure 18:
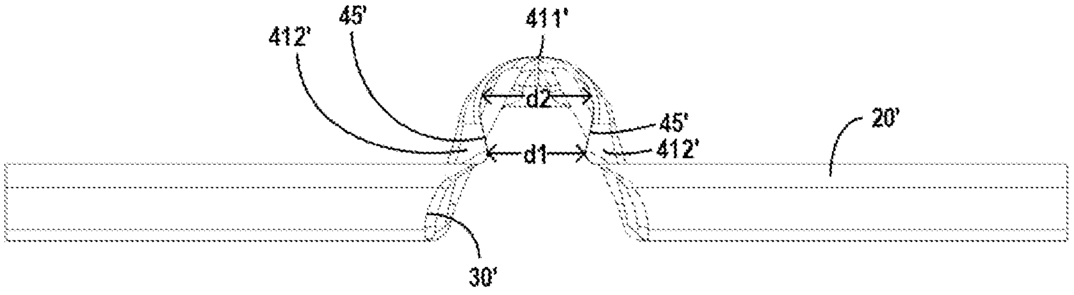
FIG. 18 is a cross-sectional view taken along a line B-B in FIG. 14.
Figure 19:
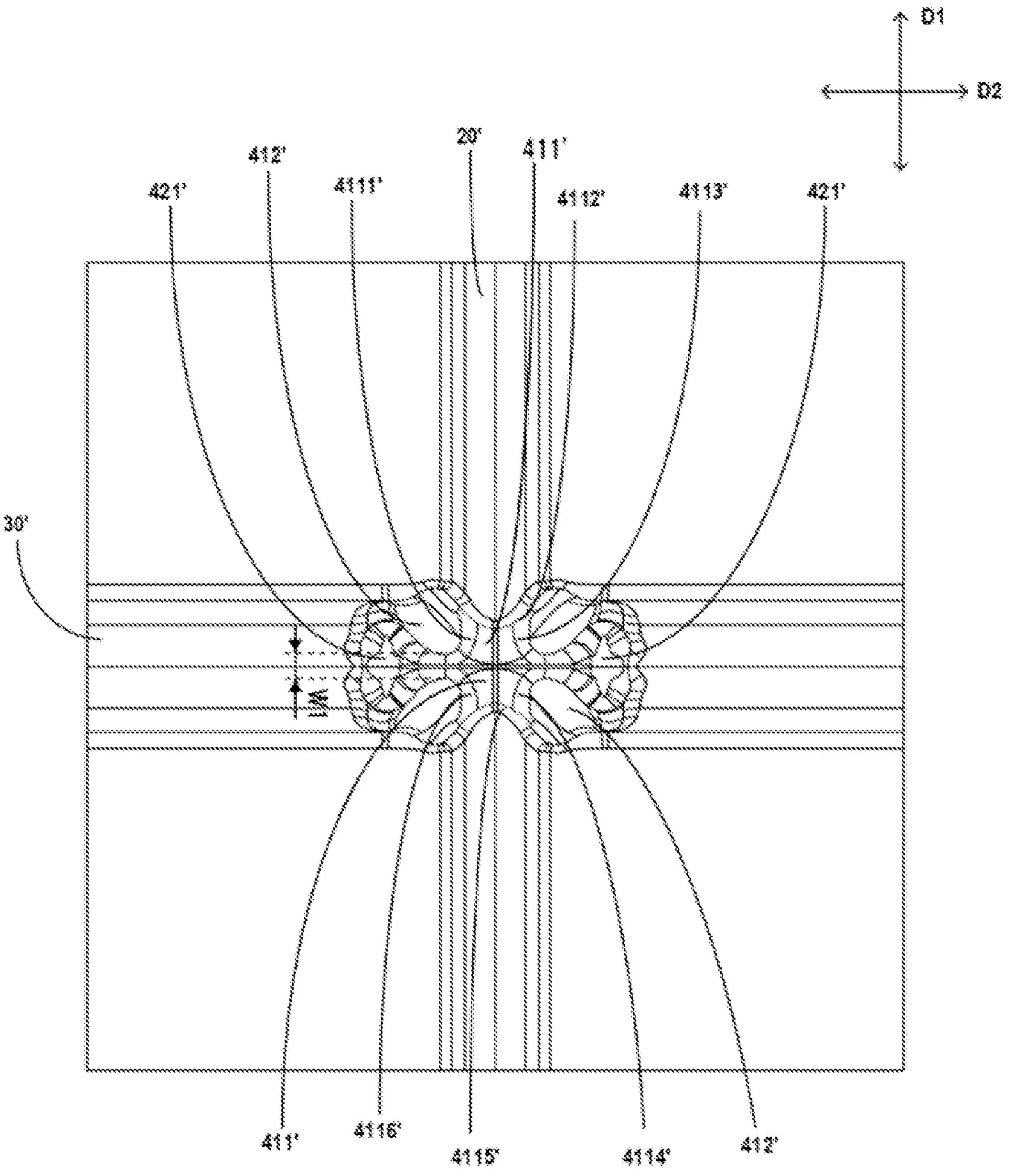
FIG. 19 is a top view of the corrugated plate.

The present disclosure provides a corrugated plate for a liquefied gas storage tank of marine engineering equipment, particularly marine equipment such as a ship, and a liquefied gas storage container having the corrugated plate. The storage container is a liquefied gas storage container for the marine equipment or a land-based apparatus for a cryogenic frozen liquid. FIGS. 1-10 and FIGS. 15-19 show schematic diagrams of a corrugated plate according to preferable implementations of the present disclosure. FIGS. 11-13 show partial schematic diagrams of a wall of a storage container according to preferable implementations of the present disclosure.

It is to be noted first that, directional and positional terms as mentioned in the present disclosure are only illustrative descriptions rather than limiting descriptions. The description about a position of a component should be understood as a relative position rather than absolute position, and the description about an extension direction of a component should be understood as a relative direction rather than an absolute direction. Directional and positional terms related to the corrugated plate may be understood with reference to positions, directions, etc. of various components shown in FIGS. 1-10. For example, terms such as "top side", "upward", "bottom side", and "downward", etc. of each component of a processing apparatus may be interpreted with reference to placement orientations of the corrugated plate shown in FIGS. 1-5 and FIGS. 7-9. A "transverse direction" and a "longitudinal direction" are two directions perpendicular to each other, where the transverse direction is represented by D2 and the longitudinal direction is represented by D1. The transverse direction D2 and the longitudinal direction D1 jointly define an extension plane of a corrugated plate body 50 of the corrugated plate. A height direction D3 is a direction perpendicular to the corrugated plate body 50.

Referring first to FIG. 1, the corrugated plate 500 includes the flat corrugated plate body 50, a transverse corrugation 70 and a longitudinal corrugation 60 that are formed on the corrugated plate body 50, and a protruding intersection portion 80 at an intersection of the longitudinal corrugation 60 and the transverse corrugation 70. The longitudinal corrugation of the corrugated plate refers to a corrugation extending along the longitudinal direction D1, and the transverse corrugation refers to a corrugation extending along the transverse direction D2. In an implementation shown in FIG. 1, a longitudinal dimension of the transverse corrugation 70 gradually decreases in a direction from a bottom side to a top side, and a transverse dimension of the longitudinal corrugation 60 gradually decreases in a direction from a bottom side to a top side. Moreover, a height of the longitudinal corrugation 60 is less than a height of the transverse corrugation 70, and a maximum transverse dimension of the longitudinal corrugation 60 is less than a maximum longitudinal dimension of the transverse corrugation 70. In other words, the transverse corrugation is a large corrugation and the longitudinal corrugation is a small corrugation. The height of each of the longitudinal corrugation 60 and the transverse corrugation 70 refers to a distance between a topmost end of the corrugation and the corrugated plate body 50 in the height direction D3.

In this implementation, the transverse corrugation 70 and the longitudinal corrugation 60 are both circular arc-shaped corrugations. For example, in projection planes shown in FIG. 2 and FIG. 4, projection profiles of the transverse corrugation 70 and the longitudinal corrugation 60 are formed into circular arc shapes, with respective top ends thereof being formed into circular arcs without edges or corners. In other implementations not shown, the transverse corrugation and/or the longitudinal corrugation may be formed into triangular corrugations. For example, in a respective cross-section (the cross-section is perpendicular to an extension direction of the corrugation) of the corrugation, a cross-sectional profile of the corrugation is formed into a rough triangle, that is, the top end of the corrugation may have an edge or corner.

In this implementation, a height of the intersection portion 80 is greater than the height of the transverse corrugation and the height of the longitudinal corrugation. The height of the intersection portion 80 refers to a distance between a top end of the intersection portion 80 and the corrugated plate body 50 in the height direction D3. The intersection portion 80 includes a smooth top surface 81 and four drawbeads 82 extending from the top surface 81 to the corrugated plate body 50 at a bottom side. The top surface 81 transitions to the drawbeads 82 smoothly, where an overall extension direction of each of the drawbeads 82 intersects the transverse direction D2, the longitudinal direction D1, and the height direction D3. It is to be noted that the "smooth top surface" means that the top surface 81 itself has no edges or corners.

Figure 6:
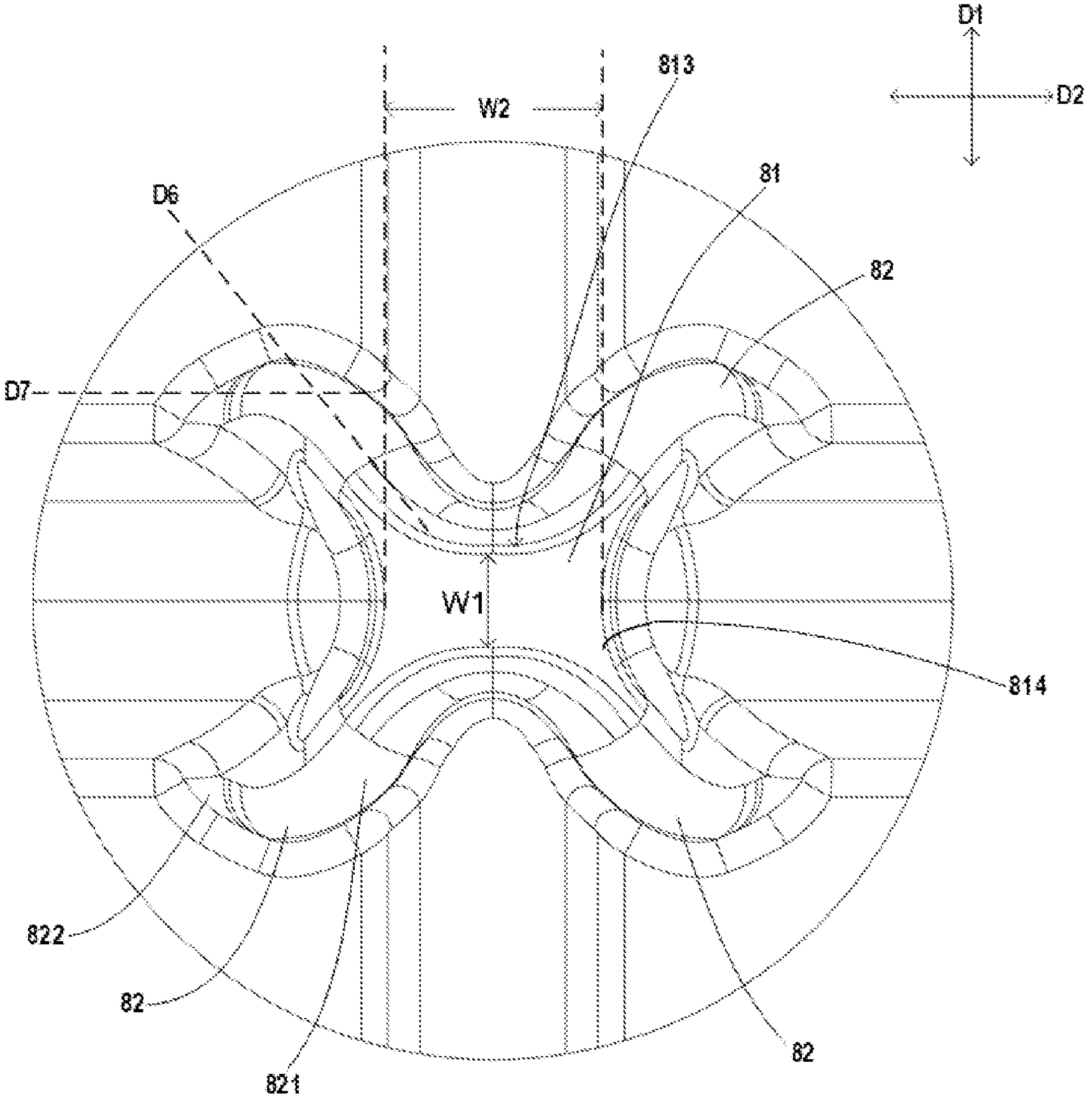
FIG. 6 is a top view of an intersection portion in FIG. 1.
Figure 7:
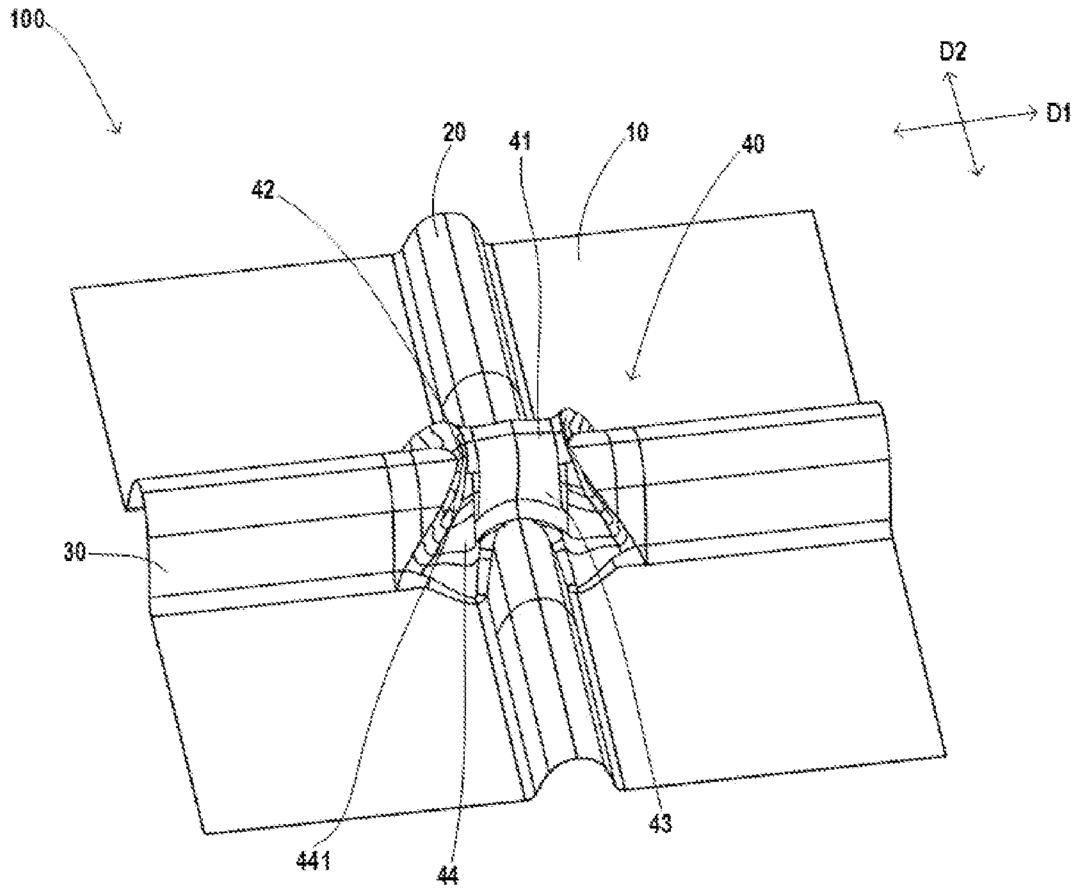
FIG. 7 is a perspective view of a corrugated plate according to another preferable implementation of the present disclosure.
Figure 8:
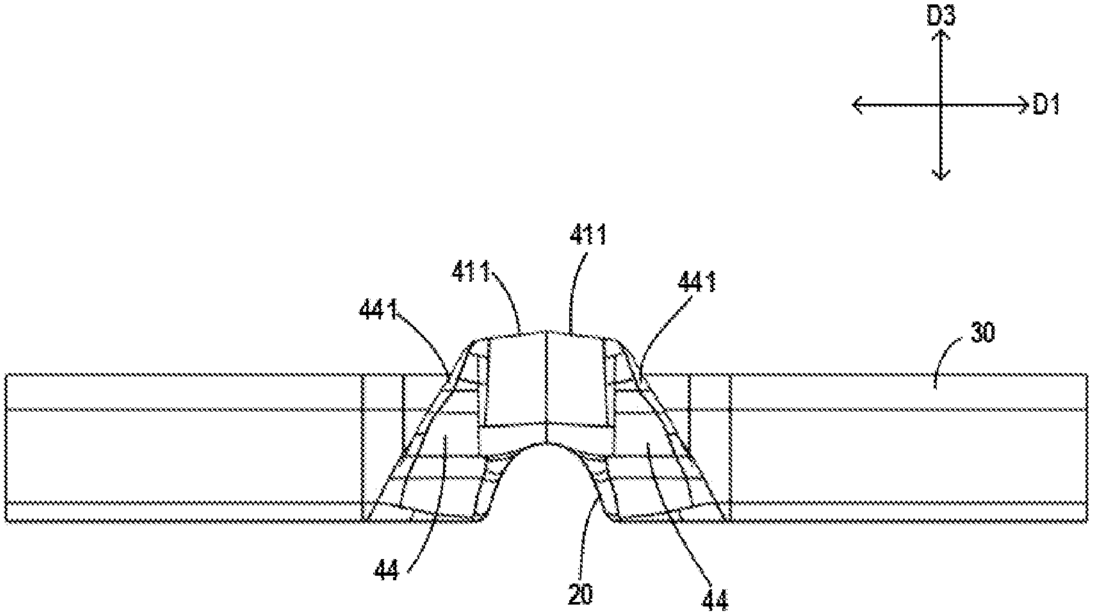
FIG. 8 is a projection of the corrugated plate as shown in FIG. 7 on a projection plane defined by a transverse direction and a height direction.
Figure 9:
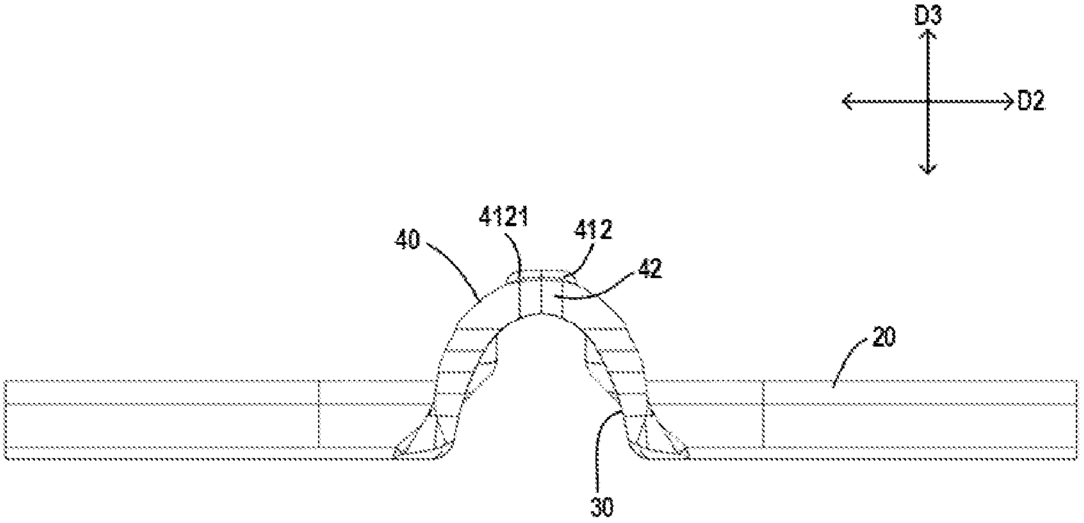
FIG. 9 is a projection of the corrugated plate as shown in FIG. 7 on a projection plane defined by a longitudinal direction and a height direction.

As can be seen from FIGS. 1 and 6, the top surface 81 has four profile boundary lines 813, 814 that define the top surface 81. The four profile boundary lines 813, 814 are connected between the four drawbeads 82 in sequence, and each of the four profile boundary lines is recessed towards a center of the top surface 81 at a middle position thereof. It can be understood that being recessed towards the center of the top surface 81 means being recessed towards the center of the top surface 81 on a plane parallel to the corrugated plate body 50. An intersection point of the adjacent profile boundary lines forms a corner of the top surface 81, and the drawbead 82 approximately extends from the corner of the top surface 81 to the corrugated plate body 50.

With continued reference to FIG. 6, among the four profile boundary lines, two profile boundary lines 813 located at two ends of the top surface 81 in the longitudinal direction have a recessed first radius of curvature, and two profile boundary lines 814 located at two ends of the top surface 81 in the transverse direction have a recessed second radius of curvature, with the first radius of curvature being greater than the second radius of curvature. It can be understood that an extension direction of the profile boundary lines 813 located at the two ends of the top surface 81 in the longitudinal direction D1 is roughly consistent with the transverse direction D2, and an extension direction of the profile boundary lines 814 located at the two ends of the top surface 81 in the transverse direction D2 is roughly consistent with the longitudinal direction D1. The recessed first radius of curvature of the profile boundary lines 813 is greater than the recessed second radius of curvature of the profile boundary lines 814, which means that a radian of the profile boundary lines 813 is gentler than a radian of the profile boundary lines 814. Alternatively, the recessed first radius of curvature of the profile boundary lines 813 may be equal to the recessed second radius of curvature of the profile boundary lines 814, which means that the profile boundary lines 813 and the profile boundary lines 814 may have same radian.

In an implementation, as seen from an overall perspective, a longitudinal dimension of the top surface 81 is less than a transverse dimension thereof. In an implementation, a length of the profile boundary lines 813 is greater than a length of the profile boundary lines 814, so that a minimum transverse dimension W2 (see FIG. 6) of the top surface 81 is greater than a minimum longitudinal dimension W1 (see FIG. 6) of the top surface 81. For example, the minimum transverse dimension W2 of the top surface 81 may be more than twice the minimum longitudinal dimension W1 of the top surface 81.

Figure 2:
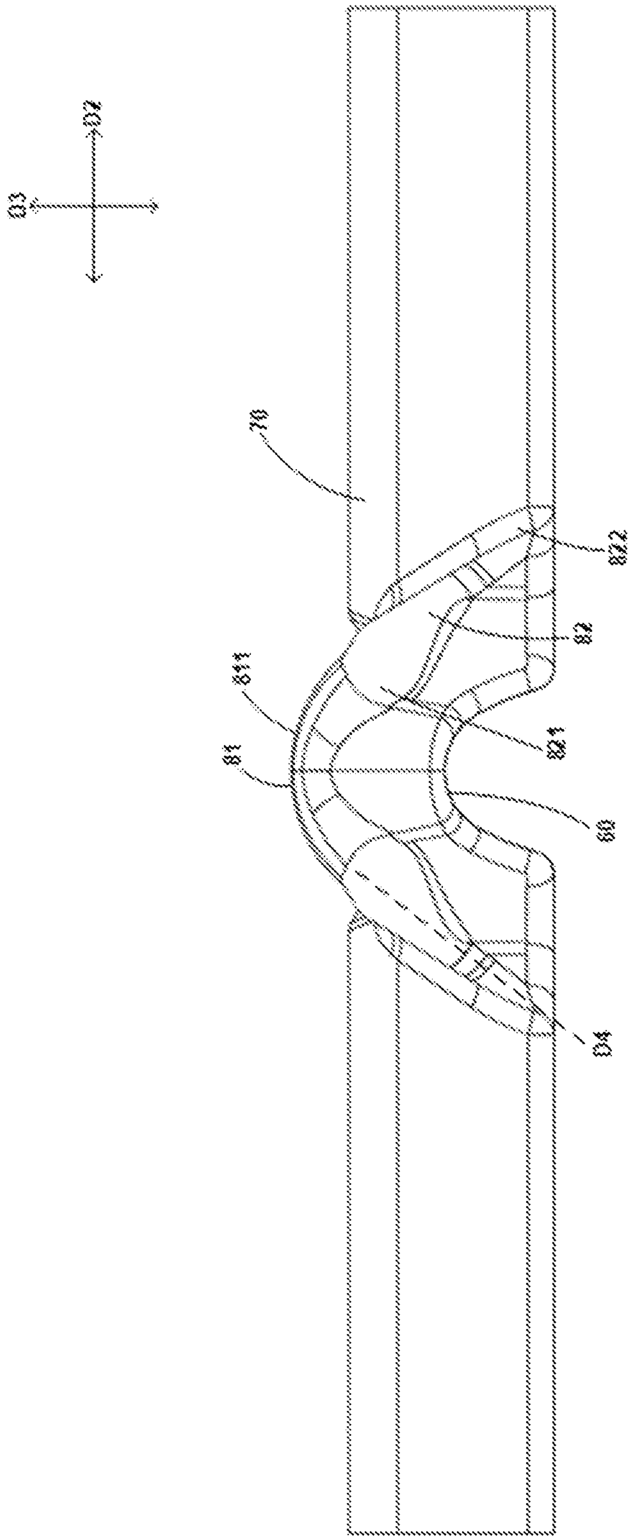
FIG. 2 is a projection of the corrugated plate in FIG. 1 on a projection plane defined by a transverse direction and a height direction.
Figure 4:
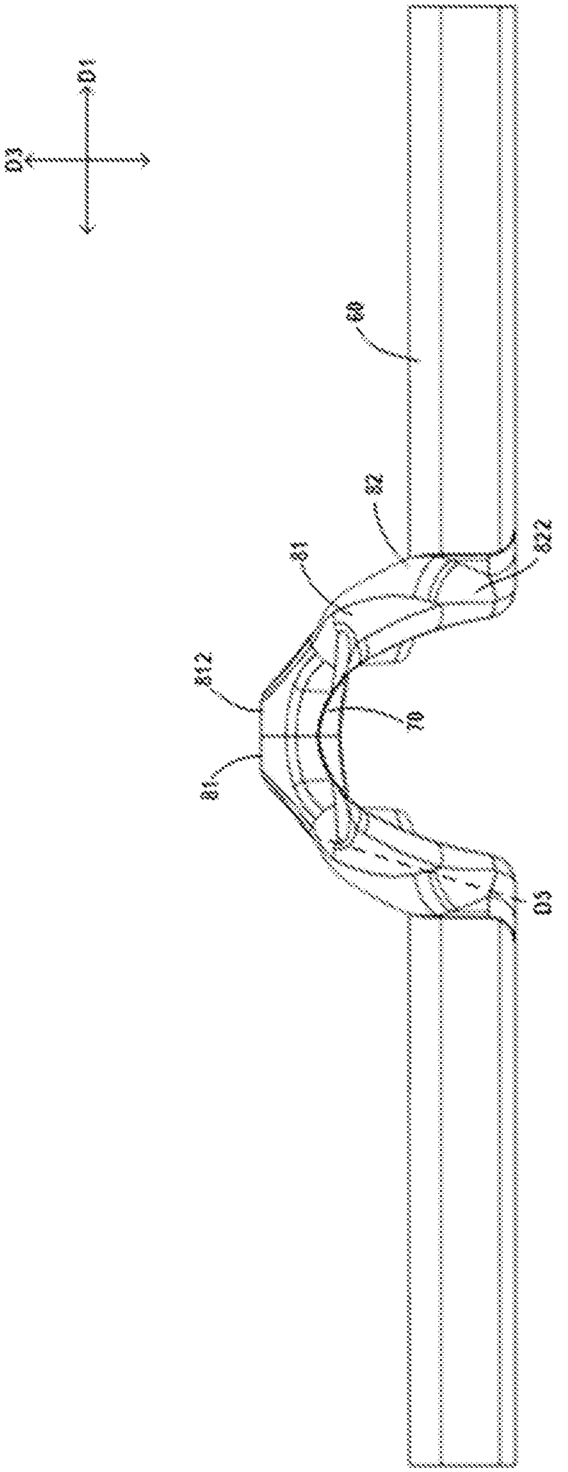
FIG. 4 is a projection of the corrugated plate in FIG. 1 on a projection plane defined by a longitudinal direction and a height direction.

The following proceeds to projections shown in FIGS. 2 and 4. As shown in FIG. 2, a projection (which is called a first projection profile 811) of the top surface 81 on a projection plane defined by the height direction D3 and the transverse direction D2 is a curve. As shown in FIG. 4, a projection (which is called a second projection profile 812) of the top surface 81 on the projection plane defined by the height direction D3 and the longitudinal direction D1 is a straight line segment. That is, from the center of the top surface 81, an extension orientation of the top surface 81 along the transverse direction D2 has a downward component, but an extension orientation of the top surface 81 along the longitudinal direction D1 does not have a downward component.

The top surface 81 transitions to the drawbeads 82 smoothly. An included angle between any position of the top surface 81 and a reference plane (the plane is parallel to the corrugated plate body 50) defined by the longitudinal direction D1 and the transverse direction D2 is less than an angle between the overall extension direction of the drawbead 82 and the reference plane. That is, referring to FIGS. 2 and 4, the top surface 81 is an arc face that is substantially parallel to the reference plane, while the drawbead 82 extends downward obviously. The overall extension direction of each drawbead 82 intersects the transverse direction D2, the longitudinal direction D1, and the height direction D3. A component of the overall extension direction of the drawbead 82 in a plane defined by the height direction D3 and the transverse direction D2 is represented by D4 in FIG. 2; a component of the overall extension direction of the drawbead 82 in a plane defined by the longitudinal direction D1 and the height direction D3 is represented by D5 in FIG. 4; and a component of the overall extension direction of the drawbead 82 in the plane parallel to the corrugated plate body 50 is represented by D6 in FIG. 6.

With continued reference to FIG. 6, the extension direction D6 of a projection of each drawbead 82 in the top view is neither parallel to the longitudinal direction D1 nor parallel to the transverse direction D2. In an implementation, the overall extension direction D6 in the top view is at an angle of approximately 40°-60° with the transverse direction D2 and the longitudinal direction D1. Further, an extension direction of a bottom segment 822 of the drawbead 82 connected with the corrugated plate body 50 is different from an extension direction of a body portion of the drawbead 82. That is, different from the overall extension direction of the drawbead 82, the bottom segment 822 of the drawbead 82 roughly extends along the transverse direction D2 and the height direction D3. A component of the extension direction of the bottom segment 822 in the top view shown in FIG. 6 is represented by D7, and it can be seen that D7 represents a direction parallel to the transverse direction D2.

Furthermore, each drawbead 82 also has a top segment 821 connected with the top surface 81, and the drawbead 82 has a maximum thickness W roughly at the top segment 821 of the drawbead 82 (see FIG. 1). A thickness of the drawbead 82 gradually decreases in a direction from a top end to a bottom end of the drawbead 82. A body of the drawbead 82 transitions to the top segment 821 and the bottom segment 822 of the drawbead 82 smoothly.

Figure 3:
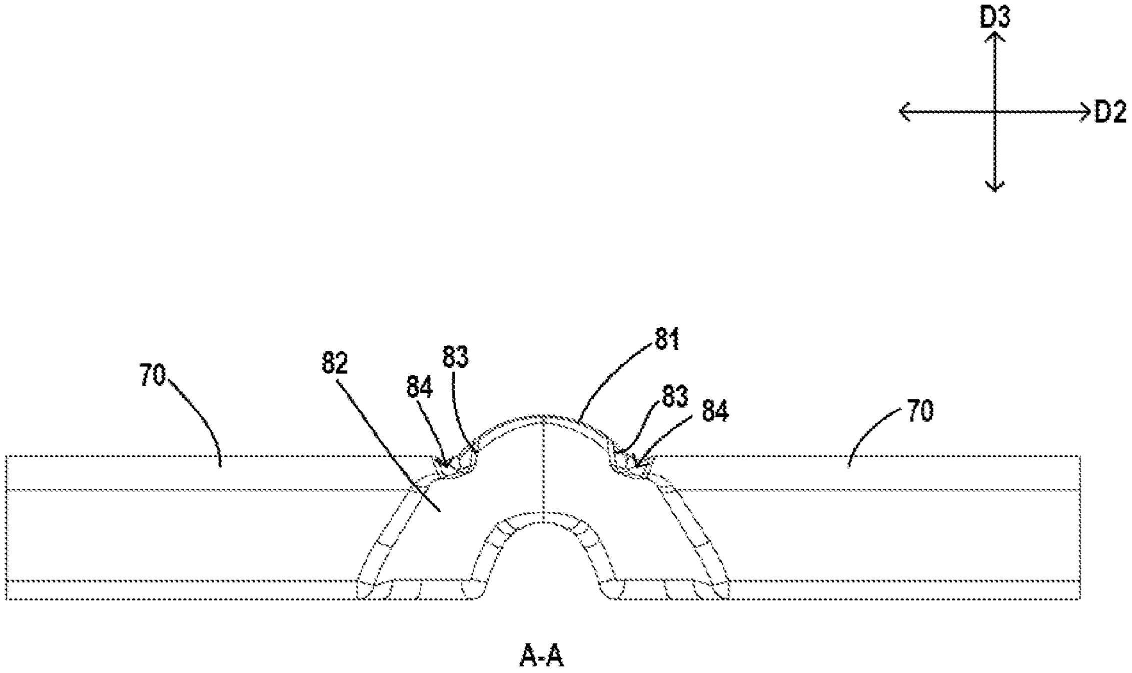
FIG. 3 is a cross-sectional view taken along a line A-A in FIG. 1.
Figure 5:
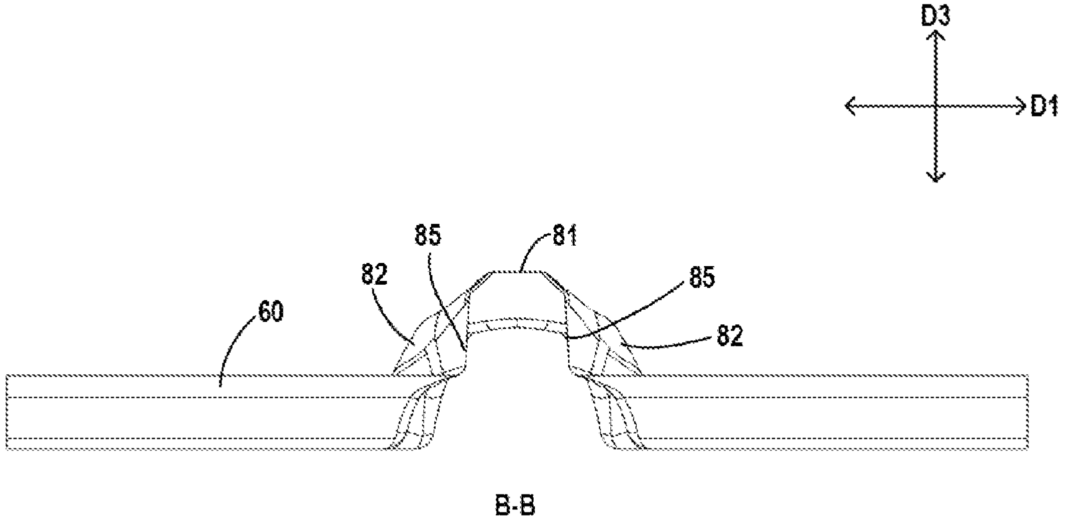
FIG. 5 is a cross-sectional view taken along a line B-B in FIG. 1.

FIGS. 3 and 5 are cross-sectional views of the corrugated plate 500 as shown in FIG. 1. Since the corrugated plate 500 itself is a relatively thin flat plate, cross-sections obtained by cutting the corrugated plate 500 in FIGS. 3 and 5 are represented by only profile lines, without showing cross-sectional lines. Referring to FIGS. 3 and 5, the intersection portion 80 also includes a first side face 85 connecting the top surface 81 and the longitudinal corrugation 60 and a second side face 83 connecting the top surface 81 and the transverse corrugation 70. The first side face 85 and second side face 83 are roughly perpendicular to the corrugated plate body 50. As shown in the cross-sections in FIGS. 3 and 5, cross-sectional profiles of the first side face 85 and the second side face 83 are roughly straight segments parallel to the direction D3 (i.e., perpendicular to the corrugated plate body 50). Of course, it can be seen from FIG. 1 that the first side face 85 and the second side face 83 are non-planar, the first side face 85 has a recessed radian (i.e., being recessed on the plane parallel to the corrugated plate body 50) consistent with that of a first profile boundary line 8211, and the second side face 83 has a recessed radian consistent with that of a second profile boundary line 8212.

Compared to solutions of "the first side face extends both downward and along the longitudinal direction" and "the second side face extends both downward and along the transverse direction", such design in this implementation leads to a sharp change in material forming, and the corrugated plate 500 presents stronger elasticity and contractility. Moreover, the intersection portion 80 has a stiffer and smoother shape, which may have better strength and stability. Further, turning back to FIG. 3, a position of the second side face 83 which intersects the transverse corrugation 70 is recessed downward relative to a top of the transverse corrugation 70. Such design creates a shallow trench 84 between the intersection portion 80 and the transverse corrugation 70, which also leads to a relatively sharp material deformation, and therefore, the corrugated plate 500 presents stronger elasticity and contractility. An intersection position between the first side face 85 and the longitudinal corrugation 60 is provided with no such trench. As can be seen from FIG. 5, a height of the intersection position between the first side face and the longitudinal corrugation 60 is flush with a top of the longitudinal corrugation 60. A part of the intersection portion 80 having the trench 84 constitutes a side segment of the intersection portion 80, and the trench 84 constitutes a top surface of the side segment. A section of the intersection portion 80 having the top surface 81 and the drawbead 82 constitutes a body segment of the intersection portion 80. Two side segments are located on two sides of the body segment in the transverse direction.

With reference to the above implementations, it can be seen that an overall shape of the corrugated plate of the present disclosure is smooth and stiff, with relatively sharp material deformations at particular positions, thereby not only ensuring an overall strength and stability of the corrugated plate, but also presenting better elasticity, contractility, and tension.

FIGS. 7-10 illustrate a corrugated plate 100 according to another preferable implementation of the present disclosure. The corrugated plate 100 has a structure similar to that of the corrugated plate 500 in FIGS. 1-6. In this implementation, the intersection portion 40 also includes a top surface 41 and drawbeads 44 extending from the top surface 41 to a corrugated plate body 10. The intersection portion 40 also has two ribs 441 that separately span the transverse corrugation 30 and are disposed symmetrically about the longitudinal corrugation 20. Each of the ribs 441 includes a first segment, a middle segment, and a second segment that are connected sequentially. The first segment and the second segment are respectively located on two sides of the transverse corrugation 30, and the middle segment constitutes a partial boundary of the top surface. The first segment and the second segment of the rib 441 respectively constitute ridges of a corresponding drawbead 44.

Further, a pair of transverse end faces 42 of the intersection portion 40 are recessed relative to each other; and a pair of longitudinal end faces 43 of the intersection portion are recessed relative to each other. On the projection plane defined by the transverse direction D2 and the height direction, a projection profile of a top of the intersection portion is composed of two straight line segments 411 intersecting at an obtuse angle. On the projection plane defined by the longitudinal direction D1 and the height direction, a projection profile of the intersection portion 40 is a dome shape 4121. The intersection portion 40 is provided with a dome-shaped protrusion portion 412 protruding from a body of the intersection portion 40 at an end of the intersection portion 40 located directly above the transverse corrugation 30.

Figure 10:
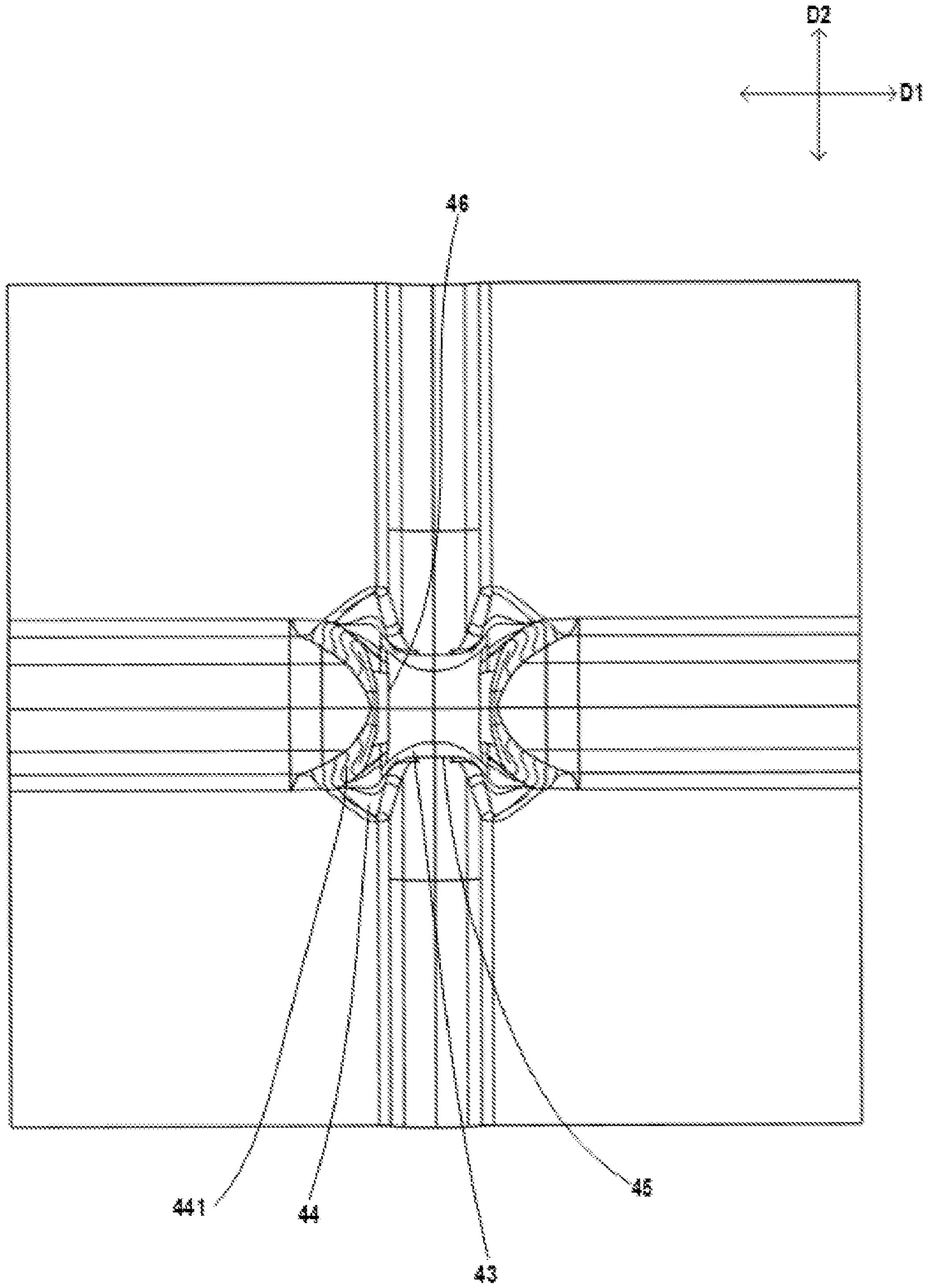
FIG. 10 is a top view of the corrugated plate as shown in FIG. 7.

Further, with reference to FIG. 10, a top surface of the intersection portion 40 also has four profile boundary lines that define the top surface. The four profile boundary lines are connected between the four drawbeads 44 in sequence, and each of the four profile boundary lines is recessed towards a center of the top surface at a middle position thereof. Among the four profile boundary lines, two profile boundary lines 45 located at two ends of the top surface in the longitudinal direction have a recessed first radius of curvature, and two profile boundary lines 46 located at two ends of the top surface in the transverse direction have a recessed second radius of curvature, with the first radius of curvature being less than the second radius of curvature. In an implementation, as shown in FIG. 10, the first radius of curvature and the second radius of curvature may be very large so that each profile boundary line is formed into a roughly straight line segment, and the top surface of the intersection portion 40 constitutes a roughly rectangle.

A material diversion core needs to be mounted at a punch of the apparatus during molding of the corrugated plate to make material formation more controllable. The corrugated plate has a small deformation in the longitudinal direction D1, thereby maintaining the performance of a raw material to a maximum extent. Meanwhile, there is a sharp deformation in the transverse direction D2, which may make the corrugated plate have better elasticity and tensile strength.

The corrugated plate shown in FIGS. 1-10 may be used as a sealing layer of a storage container, and a structure of the storage container is shown in FIGS. 11-13. Directional and positional terms related to the storage container as mentioned in the present disclosure may be understood with reference to positions, and orientations, etc. of various components shown in FIGS. 11-13. It is to be particularly noted that the directional terms used to describe the corrugated plate separately may not necessarily be consistent with the directional terms used to describe the storage container with the corrugated plate mounted on the storage container. For example, an inner side of the storage container is to be understood as a side in contact with a storage liquid, and an outer side is a side away from the storage liquid.

First referring to FIGS. 11 and 12, a wall of the storage container includes a base layer 400 and a sealing layer covering an inner side of the base layer 400, with the sealing layer being made of the corrugated plate according to the above implementations.

The wall has a central section and an annular section. In an implementation, the sealing layer includes a central section 310 and at least one annular section 320 disposed around the central section 310. Each annular section 320 includes a plurality of annular section sealing plates 3210 which are obtained by cutting the corrugated plate. A gap 350 is provided between adjacent units in each annular section, and a first sealing connector may be disposed in the gap 350. For example, the first sealing connector is disposed between circumferentially adjacent sealing plates 3220 and fixes the two sealing plates on the base layer 400. The central section 310 is composed of a sectorial central sealing plate 3110. The base layer further has a base layer central section 420 and a base layer annular section 410 which is composed of a base layer unit plate 4110.

Further, at least two annular sections 320 are provided and are arranged in an encircled manner in sequence, and the sealing layer further includes an annular section second connector 340 disposed between the adjacent annular sections 320 and fixing the adjacent annular sections on the base layer 400. Three annular sections, i.e., a first annular section 420*a*, a second annular section 420*b*, and a third annular section 420*c*, are shown in the figure. In other implementations not shown, less or more annular sections may be provided.

Transverse corrugations and longitudinal corrugations of all the annular section sealing plates 3210 of the annular section respectively constitute radial corrugations and circumferential corrugations of the annular section 320. Radial inner ends of a part of the radial corrugations 380 extend to the central section 310, and radial inner ends of the other part of the radial corrugations 360 are located in a middle portion of the annular section 320 and away from the central section 310. Such configuration can avoid an excessively large circumferential length (e.g., S1 and S2 shown in the figure) between the adjacent radial corrugations at radially outer positions on the annular section, which results in insufficient stability and ductility of these positions. As such, adding another radial corrugation between such adjacent radial corrugations can ensure that a maximum circumferential distance between the circumferentially adjacent radial corrugations is within a predetermined range. For example, if a distance between the radial inner ends of a pair of adjacent radial corrugations of the part of the radial corrugations 380 is X, the maximum circumferential distance between the circumferentially adjacent radial corrugations in the annular section may be between 1.5X and 5X. In an implementation, a sealing end cap 370 is mounted at a radial inner end of each of the radial corrugations.

FIG. 13 illustrates a rectangular wall. The sealing layer includes arrayed sealing plates 520 arranged in an array, the arrayed sealing plates adjacent to each other along a first horizontal direction are connected and sealed by a first sealing connector 5210, and the arrayed sealing plates adjacent to each other along a second horizontal direction are sealed and connected by a second sealing connector 5220. The base layer 510 also includes base layer plates arranged in an array, with a gap 5110 provided between adjacent ones of the base layer plates, the corrugated plate has a corrugation extending in the same direction as each gap, and the corrugation covers the gap.

As can be seen from the above implementations, the sealing layers of the storage container of the present disclosure may be made of standard parts with regular shapes, without requiring special shaped segments, and the standard parts can be simply cut from rectangular plates, which is simple to process and saves materials. The sealing layers of the present disclosure have good flatness, little damage to structure of thermal insulation layers, and can reduce the influence of the sealing layers on the strength of a thermal insulation box. The structure of the sealing layers of the present disclosure is such that the sealing layers can be made thinner, so that an overall thermal conductivity of the storage container can be reduced to improve a heat preservation effect. Further, sealing connectors serving as universal parts may also be used between adjacent standard parts, and some sealing connectors of the present disclosure also have certain thermal expansion and contraction, which can provide a certain amount of cold shrinkage deformation for the sealing layers. In addition, the use of the sealing connectors of the present disclosure does not require additional processing operations such as edge rolling on the sealing layer unit plate, which can improve the flatness of the sealing layers and ensure the sealing effect. A bottom wall sealing layer has no raised portions, so that a thermal insulation layer laid on the sealing layer does not need to be slotted on the back, which improves a structural strength of the thermal insulation layer. The storage container of the present disclosure is a liquefied gas storage container for marine equipment or a land-based device for cryogenic frozen liquid.

The above-mentioned corrugated plates may also be replaced by another corrugated plate shown in FIGS. 15-19. The corrugated plate 100' includes a flat corrugated plate body 10', a transverse corrugation 30' and a longitudinal corrugation 20' that are formed on the corrugated plate body 10', and a protruding intersection portion 40' at an intersection of the longitudinal corrugation 20' and the transverse corrugation 30'. The longitudinal corrugation 20' of the corrugated plate 100' refers to a corrugation extending along the longitudinal direction D1, and the transverse corrugation 30' refers to a corrugation extending along the transverse direction D2. A longitudinal dimension of the transverse corrugation 30' gradually decreases in a direction from a bottom side to a top side, and a transverse dimension of the longitudinal corrugation 20' gradually decreases in a direction from a bottom side to a top side. Moreover, a height of the longitudinal corrugation 20' is less than a height of the transverse corrugation 30', and a maximum transverse dimension of the longitudinal corrugation 20' is less than a maximum longitudinal dimension of the transverse corrugation 30'. In other words, the transverse corrugation is a large corrugation and the longitudinal corrugation is a small corrugation. The height of each of the longitudinal corrugation 20' and the transverse corrugation 30' refers to a distance between a topmost end of the corrugation and the corrugated plate body 10' in the height direction D3.

In this implementation, the transverse corrugation 30' and the longitudinal corrugation 20' are both circular arc-shaped corrugations. Projection profiles of the transverse corrugation 30' and the longitudinal corrugation 20' are formed into circular arc shapes, with respective top ends thereof being formed into circular arcs without edges or corners, and side faces thereof being walls with radians. In other implementations not shown, the transverse corrugation and/or the longitudinal corrugation may be formed into triangular corrugations. For example, in a respective cross-section (the cross-section is perpendicular to an extension direction of the corrugation) of the corrugation, a cross-sectional profile of the corrugation is formed into a rough triangle.

In this implementation, the intersection portion 40' includes a body segment 41', side segments 42', and a connection segment 43' located between the body segments 41' and each of the side segments 42'. The body segment 41' includes a smooth central top surface 411' and four drawbeads 412' extending from the central top surface 411' to the corrugated plate body 10', and the central top surface 411' transitions to the drawbeads 412' smoothly. An overall extension direction of each of the drawbeads 412' intersects the transverse direction D2, the longitudinal direction D1, and the height direction D3. It is to be noted that the overall extension direction of the drawbead 412' refers to a rough extension direction of the drawbead 412' extending from the central top surface 411' to the corrugated plate body 10'. A height of the central top surface 411' is greater than a height of the transverse corrugation 30'.

Each of the drawbeads 412' has a ridge 4121' extending from a top to a bottom thereof and being formed into a part of the drawbead 412'. There is no obvious boundary between the drawbead 412' and the connection segment 43'. However, since the ridge 4121' abuts against the longitudinal corrugation 20', it can be clearly seen that the ridge 4121' is a part of the drawbead 412', with a spacing being present between the ridge 4121' and the connection segment 43'. A width of each ridge 4121' remains unchanged in a direction from the top to the bottom. Each ridge extends downward from a top of the intersection portion 40'. The "width of the ridge" herein refers to a width of each ridge with branches being formed, and each ridge is roughly formed into a rib structure that abuts against the longitudinal corrugation 20'. It is to be noted additionally that the "width of the ridge" refers to a dimension W of the ridge 4121' in a direction perpendicular to an extension direction thereof. The ridge 4121' has a small width since it is roughly formed into the rib structure. The extension direction of the ridge 4121' is roughly parallel to the extension direction of the drawbead 412' where it is located. In an implementation, a trench 44' parallel to the ridge 4121' and extending from the top to the bottom of the drawbead 412' is provided between the ridge 4121' and the side segment 42'. An extension direction of the trench 44' is represented by D4. In another implementation, a minimum longitudinal dimension W1 of a top of the connection segment 43' is equal to or close to the width W of the ridge 4121'.

The two side segments 42' are located at two ends of the body segment 41' in the transverse direction respectively, and a height of the side segment 42' is less than the height of the transverse corrugation 30' and a height of the body segment 41'. The side segments 42' separately extend along the longitudinal direction to protrude from the longitudinal corrugation 30' in the longitudinal direction, so that the side segments 42' have protrusion portions 422' protruding from the transverse corrugation 30'. In an implementation, a top 421' of the side segment 42' forms a trench extending along the longitudinal direction D1. A longitudinal dimension at a middle position 431' on the top of the connection segment 43' in the transverse direction is less than longitudinal dimensions of a position 432' where the top of the connection segment 43' is connected with the side segment 42' and of a position 433' where the top of the connection segment 43' is connected with the body segment 41'. That is, the top of the connection segment 43' constitutes a waist drum shape, which is thinner in the middle position and expanded at junctions with the body segment 41' and the side segment 42'.

On a projection plane defined by the transverse direction D2 and the height direction D3, top surfaces of the body segment 41' and the connection segment 43' present a roughly straight line segment 4101' and are parallel to the corrugated plate body 10'. In an implementation, a length of the rough straight line segment 4101' may be 2-3 times the maximum transverse dimension of the longitudinal corrugation 20'.

In an implementation, the intersection portion 40' further includes a pair of side faces 45' extending from the central top surface 411' to the longitudinal corrugation 20'. The pair of side faces 45' are closer to each other at central positions in the transverse direction than at two end positions in the transverse direction, so that a second boundary profile 4112' and a fifth boundary profile 4115' form arc lines which are recessed towards each other. The pair of side faces 45' have a same recessed shape and a same radius of curvature as the boundary profiles (the second boundary profile 4112' and the fifth boundary profile 4115') at respective top sides thereof. Further, a spacing between central positions on the pair of side faces 45' in the height direction is greater than a spacing between bottom ends of the pair of side faces 45'. The distance between the central positions on the pair of side faces 45' in the height direction D3 is d2, and the distance between the bottom ends of the pair of side faces 45' is d1, with d2>d1.

The central top surface of the intersection portion in this implementation also has some preferable configurations. The central top surface includes six boundary profiles each of which is connected between the adjacent drawbeads 412' or between the drawbead 412' and the connection segment adjacent to each other. For example, each of a first boundary profile 4111', a third boundary profile 4113', a fourth boundary profile 4114', and a sixth boundary profile 4116' is located between the drawbead 412' and the connection segment adjacent to each other, and each of the second boundary profile 4112' and the fifth boundary profile 4115' is located between the adjacent drawbeads 412'. Each of the boundary profiles is recessed towards a center of the central top surface, and all the boundary profiles have a same radius of curvature and/or a same length. In an implementation, a longitudinal dimension of the top surface (e.g., a distance between the second boundary profile 4112' and the fifth boundary profile 4115') is greater than a transverse dimension of the top surface (e.g., a distance between an intersection of the first boundary profile 4111' and the sixth boundary profile 4116' and an intersection of the third boundary profile 4113' and the fourth boundary profile 4114'). The top 421' of the side segment 42' forms a four-pointed star shape from a look-down perspective.

The corrugated plate in FIGS. 15-19 is also applicable to a wall layer of the storage container in FIGS. 11-14. The corrugated plate shown in FIGS. 15-19 may also have some deformations. For example, an extension direction of the body segment of the drawbead may be different from that of a tail end segment. In a top view of the corrugated plate, a body portion of each drawbead extends along a direction that intersects both the longitudinal direction and the transverse direction, and a bottom segment of each drawbead extends along the transverse direction. For another example, the top surface may have other dimension options, where a minimum transverse dimension of the top surface may be set to be more than twice a minimum longitudinal dimension of the top surface.

The above corrugated plate has complex deformations at the intersection portion, but the various deformations are not sharp, thereby providing good tensile strength in a plurality of directions and achieving good strength and stability at the intersection portion. In addition, although the intersection portion has a plurality of deformations, a profile of each deformation is smooth, and an overall shape is stiff and smooth and easy to form.

Various variations and recombinations of the above implementations also fall within the scope of protection of the present disclosure.

What is claimed is:

1. A corrugated plate for a liquefied gas storage tank of a transport device, comprising: a corrugated plate body, a longitudinal corrugation and a transverse corrugation that are formed on the corrugated plate body, and an intersection portion at an intersection of the longitudinal corrugation and the transverse corrugation, wherein a height of the longitudinal corrugation is less than a height of the transverse corrugation; and a maximum transverse dimension of the longitudinal corrugation is less than a maximum longitudinal dimension of the transverse corrugation, wherein the intersection portion comprises a smooth central top surface and four drawbeads extending from the central top surface to the corrugated plate body; and the central top surface transitions to the drawbeads smoothly; wherein an overall extension direction of each of the drawbeads intersects a transverse direction, a longitudinal direction, and a height direction perpendicular to the corrugated plate body; and a height of the intersection portion is greater than the height of the longitudinal corrugation and the height of the transverse corrugation;

wherein the central top surface and the four drawbeads at least partially constitute a body segment of the intersection portion; the intersection portion further comprises two side segments; the two side segments are located at two ends of the body segment in the transverse direction respectively; and a height of each of the side segments is less than the height of the transverse corrugation and a height of the body segment, wherein each of the drawbeads has a ridge extending from a top to a bottom thereof; a width of each ridge remains unchanged in a direction from the top to the bottom; and a trench parallel to the ridge and extending from the top to the bottom of the drawbead is provided between the ridge and the side segment.

2. The corrugated plate of claim 1, wherein the side segment extends along the longitudinal direction and has a protrusion portion protruding from the transverse corrugation in the longitudinal direction.

3. The corrugated plate of claim 2, wherein a top of the side segment forms a trench extending along the longitudinal direction.

4. The corrugated plate of claim 2, wherein the intersection portion further comprises a pair of side faces extending from the central top surface to the longitudinal corrugation; the pair of side faces have a same recessed shape and a same radius of curvature as the boundary profiles at respective top sides thereof; and a spacing between central positions of the pair of side faces in the height direction is greater than a spacing between bottom ends of the pair of side faces.

5. The corrugated plate of claim 1, wherein the intersection portion further comprises a connection segment between the body segment and the side segment; and a top of the connection segment presents a waist drum shape in the transverse direction, i.e., having a minimum longitudinal dimension in a middle portion.

6. The corrugated plate of claim 5, wherein the central top surface comprises six boundary profiles; each of the boundary profiles is recessed towards a center of the central top surface; and all the boundary profiles have a same radius of curvature and/or a same length.

7. The corrugated plate of claim 1, wherein the intersection portion comprises a connection segment between the body segment and the side segment; and a minimum longitudinal dimension of a top of the connection segment is equal to or close to the width of the ridge.

8. The corrugated plate of claim 7, wherein on a projection plane defined by the transverse direction and the height direction, top surfaces of the body segment and the connection segment present a straight line segment and are parallel to the corrugated plate body.

9. The corrugated plate of claim 1, wherein a longitudinal dimension of the central top surface is greater than a transverse dimension of the central top surface.

10. The corrugated plate of claim 1, wherein respective end projection profiles of the transverse corrugation and the longitudinal corrugation are formed into circular arc shapes.

11. The corrugated plate of claim 1, wherein the top of the side segment forms a four-pointed star shape from a look-down perspective.

12. The corrugated plate of claim 1, wherein in a top view of the corrugated plate, a body portion of each of the drawbeads extends along a direction that intersects both the longitudinal direction and the transverse direction; and a bottom segment of each of the drawbeads extends along the transverse direction.

13. The corrugated plate of claim 1, wherein a minimum transverse dimension of the top surface is more than twice a minimum longitudinal dimension of the top surface.

14. A storage container for a liquefied gas, with a wall of the storage container comprising a base layer and a sealing layer located on an inner side of the base layer, wherein the sealing layer comprises the corrugated plate of claim 1.

15. The storage container of claim 14, wherein the sealing layer comprises:

a central section; and at least one annular section disposed around the central section, each of the at least one annular section comprising:

a plurality of sealing plates obtained by cutting the corrugated plate; and a first sealing connector disposed between circumferentially adjacent sealing plates and fixing the two sealing plates on the base layer.

16. The storage container of claim 15, wherein at least two annular sections are provided and are arranged in an encircled manner in sequence; and the sealing layer further comprises an annular section second connector disposed between the adjacent annular sections and fixing the adjacent annular sections on the base layer.

17. The storage container of claim 16, wherein transverse corrugations and longitudinal corrugations of all the sealing plates of the annular section respectively constitute radial corrugations and circumferential corrugations of the annular section, wherein radial inner ends of a part of the radial corrugations extend to the central section; radial inner ends of the other part of the radial corrugations are located in a middle portion of the annular section and away from the central section; a maximum circumferential distance between the circumferentially adjacent radial corrugations is within a predetermined range; and a sealing end cap is mounted at a radial inner end of each of the radial corrugations.

18. The storage container of claim 14, wherein the wall is a rectangular wall; the sealing layer comprises arrayed sealing plates arranged in an array; the arrayed sealing plates adjacent to each other along a first horizontal direction are connected and sealed by a first sealing connector; and the arrayed sealing plates adjacent to each other along a second horizontal direction are sealed and connected by a second sealing connector.

19. The storage container of claim 18, wherein the base layer also comprises base layer plates arranged in an array, with a gap being present between the adjacent base layer plates; each of the arrayed sealing plates has a corrugation extending in the same direction as each gap; and the corrugation covers the gap.

20. The storage container of claim 14, wherein the storage container is a liquefied gas storage container for marine equipment or a land-based apparatus for a cryogenic frozen liquid.

* * * * *